Figure 1:
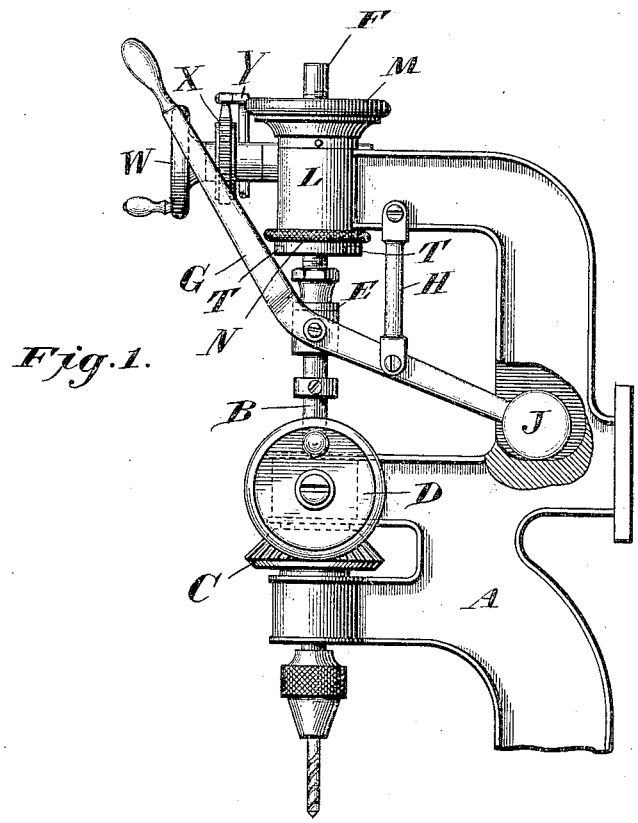

No. 767,282. PATENTED AUG. 9, 1904.
H. B. KEIPER.
DRILLING MACHINE.
APPLICATION FILED DEC. 27, 1902.
NO MODEL. 2 SHEETS—SHEET 1.

Witnesses
Elmer Leavey

Inventor
Henry B Keiper
By
his Attorney

No. 767,282. PATENTED AUG. 9, 1904.
H. B. KEIPER.
DRILLING MACHINE.
APPLICATION FILED DEC. 27, 1902.
NO MODEL. 2 SHEETS—SHEET 2.
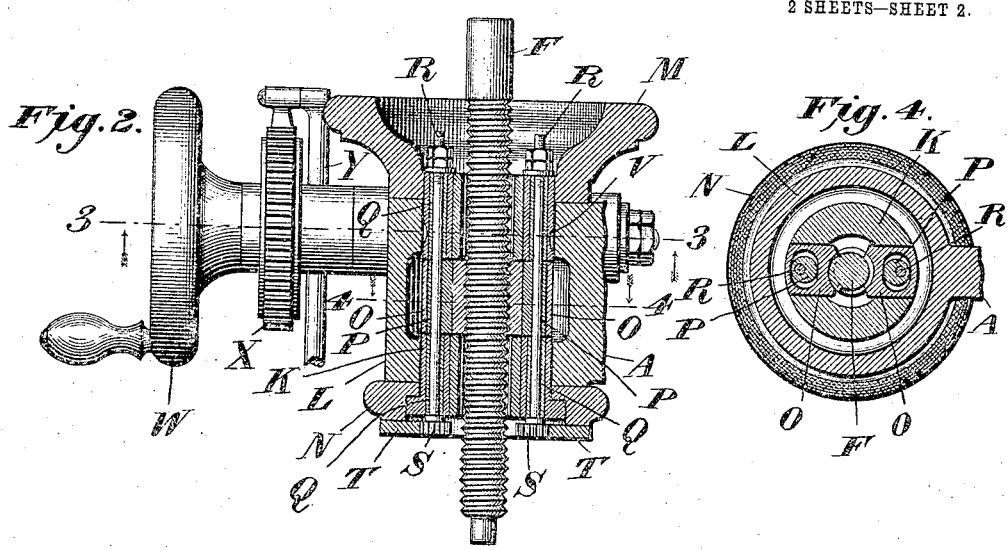
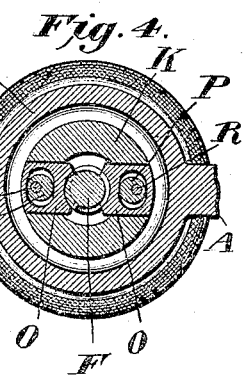
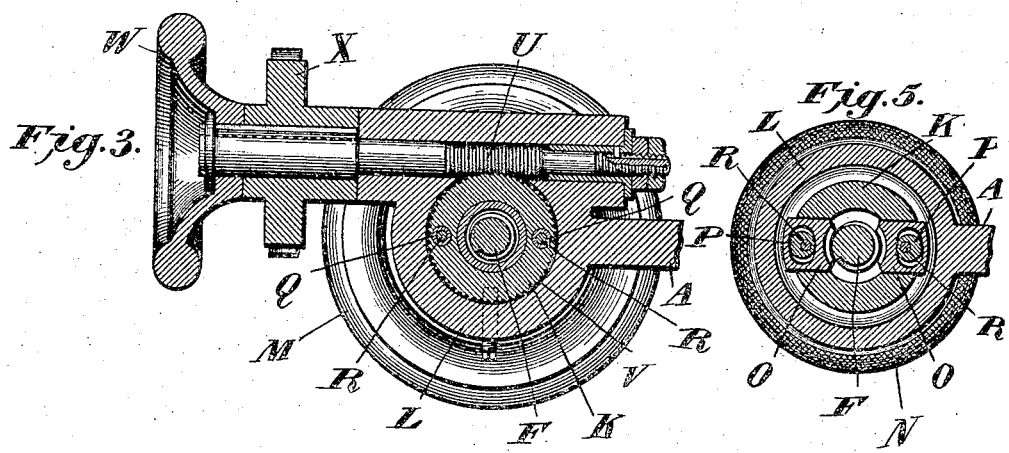
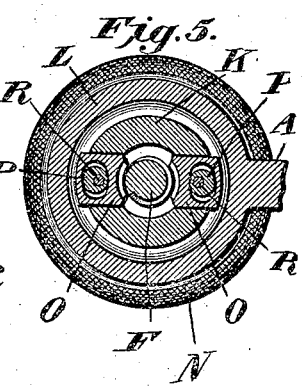
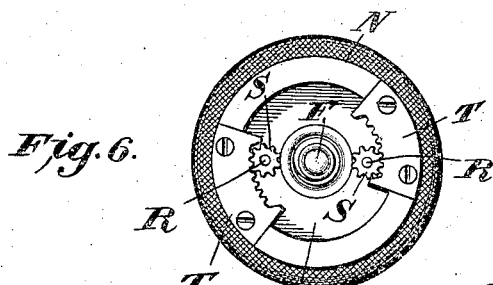

No. 767,282. Patented August 9, 1904.

UNITED STATES PATENT OFFICE.

HENRY B. KEIPER, OF LANCASTER, PENNSYLVANIA.

DRILLING-MACHINE.

SPECIFICATION forming part of Letters Patent No. 767,282, dated August 9, 1904.

Application filed December 27, 1902. Serial No. 136,855. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Drilling-Machines; and I do hereby declare the following to be a full, clear, and exact description of the invention, such as will enable others skilled in the art to which it appertains to make and use the same.

This invention relates to drilling-machines of that type in which the drill-spindle is coupled to a non-rotatable feed-screw fitted in a rotatable feed-nut or quill which is turned to move the screw longitudinally, and thus feed the drill. After the hole in the workpiece is drilled it becomes necessary, of course, to return the feed-screw to its primary position, so as to withdraw the bit and be ready for the next drilling operation. This is usually accomplished by reversing or "unscrewing" the feed-nut, so as to move the screw in a direction opposite to its feed movement, which, as well known, is generally a long tiresome operation. Various devices have been employed for effecting a quick return of the screw and connected parts—for instance, a crank-wheel and suitable gearing for rotating the feed-nut or quill reversely; but nevertheless such return action necessitates the consumption of more or less time and effort, except where it is automatically performed in a power-machine.

The principal object of the present invention is to provide improved feeding mechanism in machines of the character stated whereby the feed-screw and drill-spindle coupled thereto can be lowered or advanced freely to bring the drill to the work, then gradually moved by rotation of the feed-nut to feed the drill in the usual way, and instantly returned to withdraw the drill without the necessity of unscrewing or reversely rotating the feed-nut.

The invention will first be described with reference to the accompanying drawings, which form a part of this specification, and will then be pointed out more particularly in the annexed claims.

In said drawings I have illustrated my invention embodied in a vertical or upright drill of well-known construction; but it will be understood that the invention is susceptible of general application and can advantageously be applied to horizontal, angular, and other types of drills, as well as boring or other analogous machines.

Figure 7:
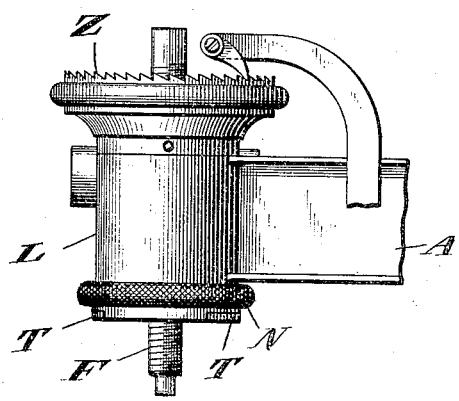

Figure 1 is a side elevation of said machine having my invention embodied therein, the base and work-supporting table being not shown. Fig. 2 is a similar enlarged elevation of the feeding mechanism, the rotatable feed-nut and its connected parts being in section. Fig. 3 is a horizontal section on line 3 3 of Fig. 2 looking upward as indicated by the arrows. Fig. 4 is a horizontal section on line 4 4 of Fig. 2, showing the movable screw-threaded devices in the feed-nut engaging the feed-screw. Fig. 5 is a section similar to Fig. 4, showing the said devices not engaging the feed-screw. Fig. 6 is a bottom plan view of the feed-nut and its bottom collar for operating said engaging or gripping devices. Fig. 7 is a side elevation of the feeding mechanism with a different device from that shown in Figs. 1, 2, and 3 for turning or rotating the feed-nut.

In the drawings, A designates the frame of the machine.

The letter B denotes the drill-spindle, which may be driven by gears C and D, operated either by hand or power. This drill-spindle, which is splined to its gear so as to move up and down in the usual way, is connected by any loose coupling E to the feed-screw F.

Preferably a lever G is employed for raising and lowering the drill when the feed-screw is disengaged from its feed-nut and allowed free vertical movement therein. Said lever, which may be fulcrumed to a swinging link H, depending from the upper part of the machine-frame, is shown connected to the coupling E, and its rear arm carries a weight J, housed in the hollow backbone of the frame. This weight should be heavy enough to lift the spindle and withdraw the drill when the feed-screw is disengaged from its feed-nut and allowed free play in the manner hereinafter explained.

The letter K, Figs. 1 to 6, inclusive, denotes the feed-nut, by rotation of which the screw is moved downward to feed the drill. Said feed-nut, comprising a sleeve or tubular body with means for engaging and coacting with the screw, is journaled in a bearing L at the upper part of the machine-frame, and, as shown, it is held in position by a collar M, rigidly attached to its upper end, as by a set-screw or set-screws, Figs. 1, 3, and 7, as well as by a ring or collar N, secured tightly to its lower end, so as to rotate with the nut, but also capable of being turned a certain distance independently for a purpose presently explained. The ring N is shown in Fig. 2 formed with an inner flange which fits between the bottom of the bearing L and an outer flange on the lower end of the feed-nut, thus holding said ring in place.

The feed-nut does not constantly engage the feed-screw, as in the ordinary construction of machines of the present character, but has a central bore loosely receiving said screw and has one or more, preferably two, screw-threaded gripping devices adapted to be closed or moved inward to engage the screw and to be opened or moved outward to release the same.

In the construction illustrated an oppositely-disposed pair of such gripping devices are shown, (designated by the letter O, Figs. 2, 4, and 5.) They consist of blocks fitted in transverse or radial slideways in the feed-nut and having their confronting faces screw-threaded to engage and coact with the feed-screw. Said blocks are shown formed transversely with the vertical slots or slightly-elongated apertures in which are located suitable rings or cylinders P, which are set eccentrically on vertical rods or bolts R, fitted in bearings in the sleeve or body of the feed-nut above and below the slideways and gripping devices or blocks. Any equivalent eccentric devices may of course be employed. Removable bushings Q may be provided for said rods to prevent wear of the sleeve. The lower ends of these rods are shown provided with toothed pinions S, which engage short annular or segmental racks T on the bottom of the ring N, said racks having, preferably, suitable projections at their ends to limit their movement with respect to the pinions. A single annular rack or gear could be employed in some instances, and other means may be employed for moving the block in and out.

When the ring N is in one position, as represented in Fig. 6, the rods R hold the eccentrics P in such position as to keep the gripping devices or screw-threaded blocks O in engagement with the feed-screw, as shown in Fig. 4, so that as the feed-nut is rotated the screw is gradually moved to feed the drill; but when the ring N is turned to its other position the pinions are turned by the racks, (about a half-turn in the present instance,) so that the eccentrics swing around and move the gripping devices outward, as indicated in Fig. 5, so that the screw can move freely through the feed-nut. It will be observed that in Fig. 4 the longer radii of the eccentrics are interposed between their axes and the innermost sides of the apertures in the blocks O, while in Fig. 5 said longer radii are interposed between said axes and the outermost sides of said apertures. The bearing L is shown formed interiorly with an annular recess to receive the outer faces of the blocks O when they are opened or moved away from the feed-screw. By this means the feed-nut can be disengaged from the feed-screw, so that the drill-spindle can be adjusted by the lever G to its proper position to start the drilling operation. Then the feed-nut can be caused to engage the screw, and when said nut is rotated the screw will move and feed the drill. When the drilling operation is completed or when it is desired to withdraw the drill at any time, the feed-nut can be disengaged by turning the ring N, which may have a milled surface, as shown, for convenient manipulation, and thereupon the drill-spindle will be raised or returned instantly to its normal or initial starting position by the weight J. The drill can then be lowered to any desired position and the work continued by again engaging the nut and screw.

In place of the weight J on lever G any suitably-arranged weight or other device may be connected to the feed-screw for effecting an instant return movement, or such weight or device may be dispensed with and the spindle may be raised and lowered entirely by the lever or by other means or by the hand of the operator directly. However, the construction shown is preferred.

Any suitable means may be employed for rotating the feed-nut. In Fig. 3 a worm or endless screw U is shown engaging an annular series of teeth V on the body of the nut. The worm-shaft has rigidly mounted on its front end a crank-wheel W for rotating it by hand, and it has also a ratchet-wheel X thereon engaged by a pawl carried by a lever Y, which is suitably connected to the driving mechanism to turn the worm-shaft automatically. In Fig. 7 the worm is dispensed with and a ratchet-wheel Z is formed on or secured to the collar M, engaged by a ratchet on an automatically-operated lever. Both constructions are well known, and hence further description is deemed unnecessary.

The invention is susceptible of various changes in details of construction and arrangement without departing from its scope.

Having thus fully described my invention, what I claim as new, and desire to secure by Letters Patent of the United States, is—

1. In a drilling-machine, the combination with the drill-spindle coupled to a feed-screw, of a rotatable feed-nut inclosing said screw and adapted to engage or disengage the same, and means for operating said feed-nut to engage or disengage said screw, whereby the screw can be advanced to feed the drill or allowed to move freely in the feed-nut when disengaged by the latter, means for quickly returning the feed-screw to normal position when disengaged, and means for rotating said feed-nut, substantially as described.

2. In a drilling-machine, the combination with the drill-spindle coupled to a feed-screw, of a feed-nut for said screw comprising a rotatable body, having an axial opening through which the screw can move freely, a movable device carried thereby having screw-threads to coact with the screw, a rod journaled in said body having a pinion thereon and eccentrically connected to said movable device, and a rack engaging said pinion and rotatable with said body but capable of being turned independently, whereby said device can be caused to engage and disengage the screw, and means for rotating said feed-nut, substantially as described.

3. In a drilling-machine, the combination with the drill-spindle coupled to a feed-screw, of a feed-nut for said screw comprising a rotatable body, having an axial opening through which the screw can move freely, and a number of transversely-movable devices carried by said body having screw-threads on their inner faces adapted to coact with the screw, rods journaled in said body eccentrically connected to said devices, and having pinions thereon, and a ring rotatable with said body but capable of an independent turning having an annular rack or racks engaging said pinions, whereby said ring may be turned to cause said devices to move in and out to engage and disengage the screw, and means for rotating said feed-nut, substantially as described.

4. In a drilling-machine, the combination with the drill-spindle coupled to a feed-screw, of a rotatable body loosely inclosing said screw having transverse or radial slideways therein, movable blocks fitted in said slideways having screw-threads on their inner faces adapted to coact with the screw, for advancing the latter by the rotation of said body, means for opening and closing said blocks or causing them to engage and disengage the screw, and means for rotating said body, substantially as described.

5. In a drilling-machine, the combination with the drill-spindle coupled to a feed-screw, of a feed-nut for said screw comprising a body having an axial opening through which the screw can move freely, transversely-movable devices carried by said body screw-threaded on their inner faces to coact with the screw, rods journaled in said body having eccentric parts located in transverse slots in said devices, and means for turning said rods and thereby moving said devices in and out, substantially as described.

6. In a drilling-machine, the combination with the drill-spindle coupled to a feed-screw, of a feed-nut therefor having movable threaded devices adapted to engage or disengage the screw, rods connected to said devices with provision, when turned to move them in and out, pinions on said rods, and a ring capable of being turned independently of the body of said feed-nut and having a rack or racks engaging said pinions, substantially as described.

7. In a drilling-machine, a non-rotatable feed-screw and a drill-spindle coupled thereto for longitudinal movement therewith while permitting independent rotation thereof, in combination with a rotatable feed-nut having means for engaging the screw to advance the latter when said feed-nut is rotated, means for rotating said feed-nut, means for releasing the screw from said engaging means, and means for quickly automatically returning the feed-screw to its normal position when released by said engaging means, substantially as described.

8. In combination with a non-rotating feed-screw, a rotatable body through which said screw passes, means carried by said body for engaging the threads of said screw to advance the latter by the rotation of said body, means for rotating said body, means for releasing the screw from said engaging means, and means for adjusting the screw and feeding by hand independently of the action of said rotating body when the screw is released by said engaging means, substantially as described.

In testimony whereof I affix my signature in presence of two witnesses.

HENRY B. KEIPER.

Witnesses:
J. GUY ESHLEMAN,
L. B. KEIPER.